Patented Mar. 17, 1936

2,034,491

UNITED STATES PATENT OFFICE 2,034,491

ANTIOXIDANT

Arthur W. Sloan, Akron, Ohio, assignor to The B. F. Goodrich Company, New York, N. Y., a corporation of New York No Drawing. Application May 26, 1933,
Serial No. 673,116

26 Claims. (Cl. 18—50)

This invention relates to the art of preserving rubber, fatty oils, petroleum products, synthetic plastics, and like organic materials against unduly rapid deterioration due to oxidation and the like.

This invention, in brief, consists in treating the rubber or other organic material with a member of a class of compounds which may be designated as diamino diaryl alkanes, in which both aryl groups are attached to the same central aliphatic carbon atom, as opposed to a terminal atom, of a hydrocarbon nucleus. They have the general structural formula

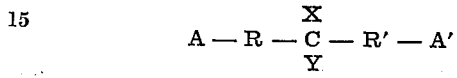

wherein A and A' represent amino groups, R and R' represent aromatic nuclei, and X and Y represent hydrocarbon groups. The amino groups A and A' may be either primary, secondary or tertiary and may contain any hydrocarbon substituents such as alkyl, aryl or aralkyl groups. The groups X and Y may likewise consist of separate alkyl, aryl or aralkyl groups, or may even consist of a bivalent hydrocarbon group forming a ring embracing the central carbon atom of the type formula.

For example, the following compounds are typical members of the class of anti-oxidants described above: p,p' diamino diphenyl dimethyl methane; p,p' diamino diphenyl methyl ethyl methane; p,p' diamino diphenyl methyl propyl methane; p,p' diamino diphenyl methyl butyl methane; p,p' diamino diphenyl diethyl methane; p,p' diamino triphenyl methyl methane; p,p' diamino tetraphenyl methane; p,p' diamino diphenyl 1,1 cyclohexane; p,p' diamino di-o-tolyl dimethyl methane; diamino dinaphthyl dimethyl methane; p,p' di(methylamino) diphenyl dimethyl methane; p,p' di(butylamino) diphenyl dimethyl methane; p,p' di(benzylamino) diphenyl dimethyl methane; p,p' dianilino diphenyl dimethyl methane; p,p' dianilino diphenyl 1,1 cyclohexane; p,p' di(naphthylamino) diphenyl dimethyl methane; p,p' di(naphthylamino) di-m-tolyl dimethyl methane; p,p' di(naphthylamino) dinaphthyl dimethyl methane; p,p' di(naphthylamino) diphenyl diethyl methane; p,p' di(naphthylamino) diphenyl 1,1 cyclohexane; p,p' di(naphthylamino) diphenyl dipropyl methane; p,p' di(naphthylamino) diphenyl di(2-methyl-propenyl) methane; p,p' di(p-tolylamino) diphenyl dimethyl methane; p,p' di(p-cumylamino) diphenyl 1,1 cyclohexane; tetramethyl p,p' diamino diphenyl dimethyl methane; tetraethyl p,p' diamino diphenyl dimethyl methane; p,p' di(phenyl methyl amino) diphenyl dimethyl methane; p-amino p'phenylamino diphenyl dimethyl methane; p-dimethylamino p'phenylamino diphenyl dimethyl methane; tetramethyl diamino dinaphthyl dimethyl methane; as well as the corresponding compounds substituted in the ortho, meta or other positions. Any of the above-enumerated compounds may be used with good effect to retard the deterioration of rubber and other like organic substances, preferably in moderately small proportions, say from 0.1 to 5 per cent.

The compounds employed as anti-oxidants in this invention may be prepared by any of the usual methods familiar to organic chemists. Many of them are most conveniently prepared by reacting a ketone with an appropriate aromatic amine. For example, p,p' diamino diphenyl dimethyl methane may be prepared by reacting acetone with an excess of aniline in an acid medium, or by reacting the acetone and aniline first in a neutral medium, and subsequently rearranging the intermediate product thus formed, by heating in the presence of acid or an acid salt of aniline. Similarly, p,p'dianilino diphenyl dimethyl methane may be prepared by reacting acetone with an excess of diphenylamine in an acid medium, or first reacting in a neutral medium and then rearranging the intermediate product with acid. Furthermore, p,p' di(naphthylamino) diphenyl dimethyl methane may be made by condensing either alpha or beta naphthol with p,p'diamino diphenyl dimethyl methane, which may be prepared in the manner just described.

As a specific example of one embodiment of the invention of this application, a rubber composition is prepared containing blended plantation rubber 100 parts by weight, sulphur 5.5 parts, zinc oxide 30 parts, gas black 40 parts, mineral rubber 10 parts, palm oil 5 parts, and hexamethylene tetramine 0.75 part. One portion of this composition is used as a control, while another portion is further mixed with 0.96 part by weight (0.5% of the composition) of p,p'diamino diphenyl dimethyl methane. After vulcanization in a press for 45 minutes at 294° F. to produce an optimum cure, it is found that the composition containing the anti-oxidant deteriorates only approximately one-half as fast as the control composition when subjected to an accelerated aging test such as the Geer oven test.

It is to be understood that the term "treating" is employed in the appended claims in a generic sense to include either the incorporation of the anti-oxidants into the rubber or the like by mixing them into the said material while it is in a plastic or fluid condition, or by applying them to the surface of a solid mass thereof as a paste, powder or solution. The term "rubber" is likewise employed in the claims in a generic sense to include caoutchouc, both natural and synthetic, balata, gutta percha, rubber isomers and like products, whether or not admixed with fillers, pigments, or vulcanizing or accelerating agents.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

This application is a continuation in part of my co-pending application Serial No. 301,423 filed August 22, 1928.
I claim:
1. The method of preserving rubber which comprises treating rubber with a substance having the general formula

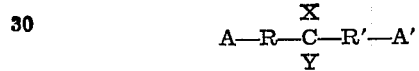

wherein A and A' represent amino groups which may contain hydrocarbon substituents, R and R' represent aromatic nuclei, and X and Y represent hydrocarbon groups.

2. The method of preserving rubber which comprises treating rubber with a substance having the general formula

wherein A and A' represent amino groups which may contain hydrocarbon substituents, R and R' represent aromatic nuclei, and X and Y represent aliphatic hydrocarbon groups.

3. The method of preserving rubber which comprises treating rubber with a substance having the general formula

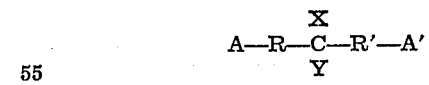

wherein A and A' represent primary amino groups, R and R' represent aromatic nuclei, and X and Y represent alkyl groups.

4. The method of preserving rubber which comprises treating rubber with p,p' diamino diphenyl dimethyl methane.

5. The method of preserving rubber which comprises treating rubber with a substance having the general formula

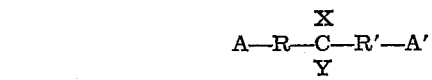

wherein A and A' represent alkyl substituted amino groups, R and R' represent aromatic nuclei, and X and Y represent hydrocarbon groups.

6. The method of preserving rubber which comprises treating rubber with a substance having the general formula

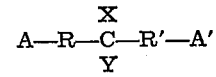

wherein A and A' represent tertiary amino groups, R and R' represent aromatic nuclei, and X and Y represent aliphatic hydrocarbon groups.

7. The method of preserving rubber which comprises treating rubber with tetramethyl p,p' diamino diphenyl dimethyl methane.

8. The method of preserving rubber which comprises treating rubber with a substance having the general formula

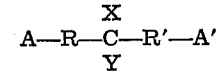

wherein A and A' represent hydrocarbon substituted amino groups, R and R' represent aromatic nuclei, and X and Y represent hydrocarbon groups.

9. The method of preserving rubber which comprises treating rubber with a substance having the general formula

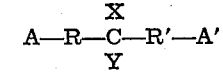

wherein A and A' represent aryl substituted amino groups, R and R' represent aromatic nuclei, and X and Y represent aliphatic hydrocarbon groups.

10. The method of preserving rubber which comprises treating rubber with a substance having the general formula

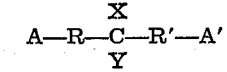

wherein A and A' represent secondary hydrocarbon substituted amino groups, R and R' represent aromatic nuclei, and X and Y represent hydrocarbon groups.

11. The method of preserving rubber which comprises treating rubber with a substance having the general formula

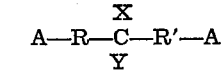

wherein A and A' represent secondary arylamino groups, R and R' represent p-phenylene groups, and X and Y represent alkyl groups.

12. The method of preserving rubber which comprises treating rubber with p,p' dianilino diphenyl dimethyl methane.

13. A composition comprising rubber and a substance having the general formula

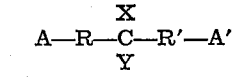

wherein A and A' represent amino groups which may contain hydrocarbon substituents, R and R' represent aromatic nuclei, and X and Y represent hydrocarbon groups.

14. A composition comprising rubber and a substance having the general formula

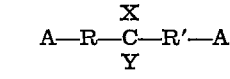

wherein A and A' represent amino groups which may contain hydrocarbon substituents, R and R' represent benzene nuclei, and X and Y represent alkyl groups.

15. A composition comprising rubber and a substance having the general formula $$A-R-\underset{Y}{\overset{X}{C}}-R'-A'$$

wherein A and A' represent primary amino groups, R and R' represent aromatic nuclei, and X and Y represent alkyl groups.

16. A composition comprising rubber and p,p' diamino diphenyl dimethyl methane.

17. A composition comprising rubber and a substance having the general formula $$A-R-\underset{Y}{\overset{X}{C}}-R'-A'$$

wherein A and A' represent alkyl substituted amino groups, R and R' represent aromatic nuclei, and X and Y represent hydrocarbon groups.

18. A composition comprising rubber and a substance having the general formula $$A-R-\underset{Y}{\overset{X}{C}}-R'-A'$$

wherein A and A' represent tertiary amino groups, R and R' represent aromatic nuclei, and X and Y represent aliphatic hydrocarbon groups.

19. A composition comprising rubber and a substance having the general formula $$A-R-\underset{Y}{\overset{X}{C}}-R'-A'$$

wherein A and A' represent dialkylamino groups, R and R' represent benzene nuclei, and X and Y represent alkyl groups.

20. A composition comprising rubber and tetramethyl p,p' diamino diphenyl dimethyl methane.

21. A composition comprising rubber and a substance having the general formula $$A-R-\underset{Y}{\overset{X}{C}}-R'-A'$$

wherein A and A' represent secondary hydrocarbon substituted amino groups, R and R' represent aromatic nuclei, and X and Y represent alkyl groups.

22. A composition comprising rubber and a substance having the general formula $$A-R-\underset{Y}{\overset{X}{C}}-R'-A'$$

wherein A and A' represent secondary arylamino groups, R and R' represent p-phenylene groups, and X and Y represent alkyl groups.

23. A composition comprising rubber and p,p' dianilino diphenyl dimethyl methane.

24. The process of increasing the resistance of rubber to deterioration which comprises incorporating with the rubber a compound having the general formula $$A-R-\underset{Y}{\overset{X}{C}}-R'-A'$$

wherein A and A' represent amino groups or alkyl or dialkyl substituted amino groups, R and R' represent aryl groups, and X and Y represent alkyl substituents.

25. Rubber having incorporated therein a small amount of a compound having the general formula $$A-R-\underset{Y}{\overset{X}{C}}-R'-A'$$

wherein A and A' represent amino groups or alkyl or dialkyl substituted amino groups, R and R' represent aryl groups and X and Y represent alkyl substituents.

26. Rubber having incorporated therein a small amount of a compound having the general formula $$A-R-\underset{Y}{\overset{X}{C}}-R'-A'$$

wherein A and A' represent amino groups or alkyl or dialkyl substituted amino groups, R and R' represent aryl groups, and X and Y represent methyl groups.

ARTHUR W. SLOAN.